United States Patent [19]
Merrill et al.

[11] Patent Number: 5,091,993
[45] Date of Patent: * Mar. 3, 1992

[54] INSECT PROTECTIVE GARMENT

[76] Inventors: Janice L. Merrill, 5 Japa Ct., Milford, N.H. 03055; Phyllis Biron, R.F.D. 3, Off Long Pond Rd., Goffstown, N.H. 03045

[*] Notice: The portion of the term of this patent subsequent to Dec. 25, 2007 has been disclaimed.

[21] Appl. No.: 620,670

[22] Filed: Dec. 3, 1990

Related U.S. Application Data

[63] Continuation-in-part of Ser. No. 367,010, Jun. 16, 1989.

[51] Int. Cl.⁵ .................. A41D 13/00; A42B 1/00
[52] U.S. Cl. .................................. 2/4; 2/84; 2/202; 2/206
[58] Field of Search .......... 2/4, 84, 93, 94, 108, 2/173, 202, 203, 2, 2.5, 69, 69.5, 81, 82, 84, 206, 207

[56] References Cited

U.S. PATENT DOCUMENTS

| | | | |
|---|---|---|---|
| 1,033,047 | 7/1912 | Cabelinsky | 2/84 |
| 1,097,530 | 5/1914 | Cabelinsky | 2/84 |
| 2,170,339 | 8/1939 | Reeves | 2/84 |
| 3,389,407 | 6/1968 | Morrison | 2/84 |
| 4,220,299 | 9/1980 | Molter | 2/84 X |
| 4,347,629 | 9/1982 | Itoi | 2/108 |
| 4,979,236 | 12/1990 | Merrill et al. | 2/84 X |
| 4,985,933 | 1/1991 | Lemoine | 2/4 X |

Primary Examiner—Werner H. Schroeder
Assistant Examiner—Jeanette E. Chapman
Attorney, Agent, or Firm—George W. Dishong

[57] ABSTRACT

An insect proof garment for protection against mosquitoes, black flies and other insects is disclosed. The garment is made entirely from a lightweight semi-rigid insect excluding mesh and is comprised of a one-piece fully encloseable head net attached to an upper body portion, with the upper body portion extending from the neck to proximate the hips of the wearer and has sleeves connected thereto. There is a separate lower portion extending from the wearer's waist and having leg members connected thereto. The one-piece fully encloseable head net is preferrably stitched to an upper body portion from about a right side shoulder seam to about a left side shoulder seam thereby forming a rear portion of a neckline. A means for opening and closing of the heat net (preferably a zipper) is appropriately attached to a front portion of the neckline. The zipper provides a means for the wearer to optionally open and close the fully encloseable head net and permits the wearer to place the head net to the rear of the wearer's face.

6 Claims, 4 Drawing Sheets

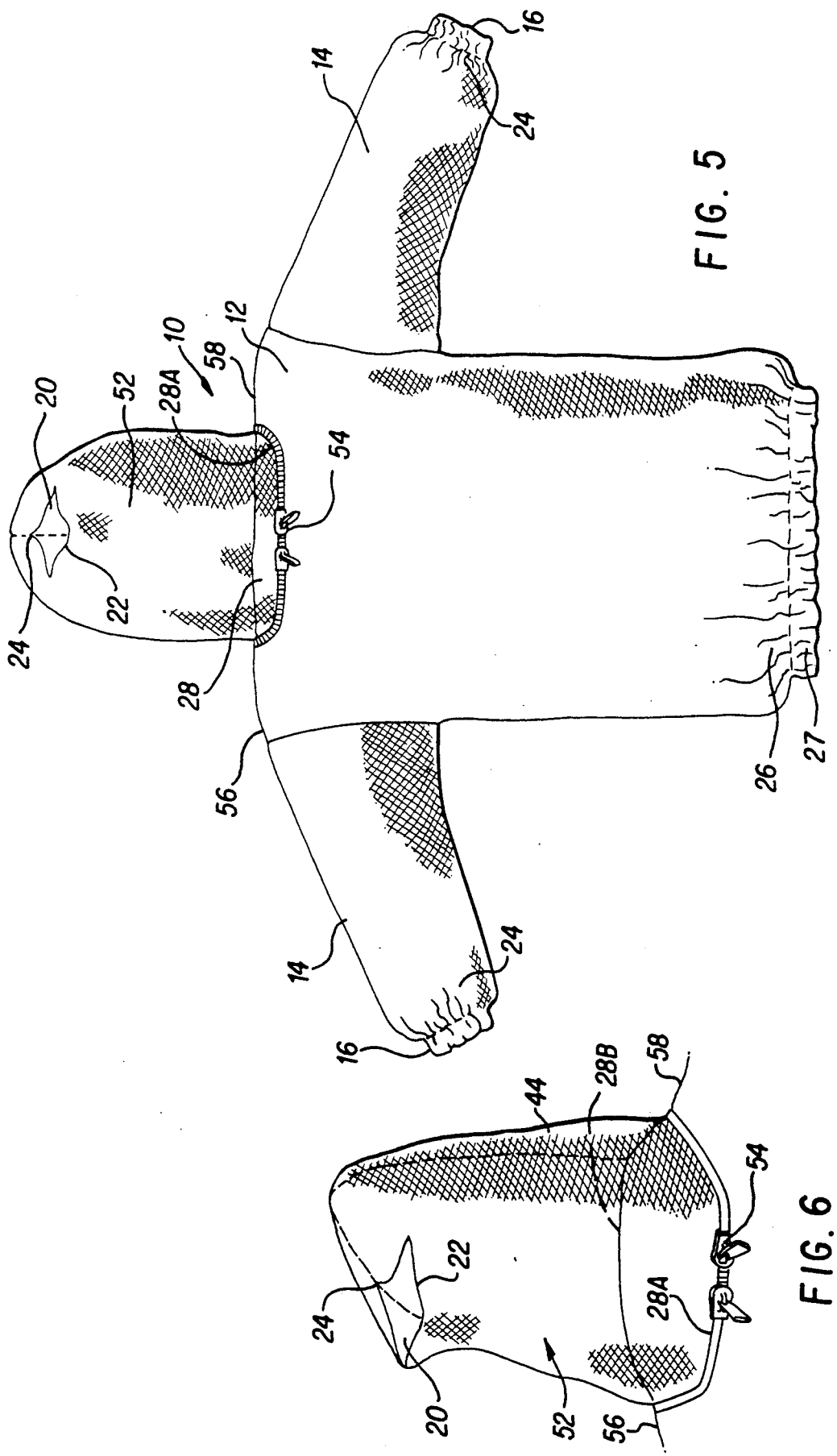

INSECT PROTECTIVE GARMENT

BACKGROUND OF THE INVENTION

This application is a continuation-in-part of U.S. patent application Ser. No. 367,010, filed on June 16, 1989.

FIELD OF THE INVENTION

This invention most generally relates to the field of protective garments that protect the user against insects. Most particularly this invention relates to an insect protective garment made entirely of a lightweight semi-rigid insect excluding mesh designed and fabricated in a manner which causes the garment to substantially "stand away" from the body of the wearer so as to obviate the need for a plurality of fabrics and the need for intermediate fabrics and/or devices to separate the mesh layer from the wearer's body.

DESCRIPTION OF THE PRIOR ART

Mosquitoes, black flies and other insects have long plagued gardeners, sportsmen, and anyone else who enjoys the outdoors. Various lotions and sprays have been developed to repel these insects but their success is limited, they present a possible health hazard, and even so do not remove the possibility of insects physically entering a person's eyes, ears, nose or mouth. An object of this invention is to provide a comfortable protective garment that protects the wearer from insects without the use of ineffective or potentially dangerous chemical products.

Protective clothing and protective garments are known in the prior art. Examples of protective garments in the prior art are disclosed in U.S. Pat. Nos. 3,783,451; 4,395,781; 4,422,184; 4,685,152; and 4,716,594. These patents are relevant to the applicants' invention in that they represent the closest prior art disclosing protective garments and the like. None of the above identified patents disclose a garment that is totally free from zippers, closures, face openings, spacers, multiple layers of mesh and/or fabrics of various types and other complicated and complicating elements or features. Moreover, these complicating features reduce the overall protective feature of the prior art garments. Another object of the instant invention is to provide an opening-free garment when on the wearer and which is simple and easy to put on and take off. A still further object of the invention is to provide an effective and yet low cost garment.

SUMMARY OF THE INVENTION

The present invention in it's most simple form or embodiment is directed to a garment to protect the user against mosquitoes, black flies and other insects. The garment is made entirely from a semi-rigid insect excluding but see-through mesh, so that it is comfortable during physical exertion or for use in warmer weather and preferably the mesh is also lightweight material. The mesh is a semi-rigid material such as, for example, the screening material commonly used in campers and tents. The garment is thus durable and suitable for people working or playing outdoors. This material makes a garment that allows the user freedom of movement because it is loose fitting, while at the same time being rigid enough to make the mesh stand away from body surfaces of the wearer without the need for any other devices. It is sufficiently loose enough to pass over normal outer garments of the wearer to completely enclose the body of the wearer and protect the wearer from the bother of insects.

The garment comprises a one-piece head net which fully encloses the wearer's head and jointed to the upper body portion at the neck. The one-piece fully encloseable head net is preferably stiched to an upper body portion from about a right side shoulder seam to about a left side shoulder seam thereby forming a rear portion of a neckline. A means for opening and closing of the heat net (preferably a zipper) is appropriately attached to a front portion of the neckline.

The upper body portion of the garment extends from the neck to proximate the hips of the wearer and has the arms connected thereto. The separate lower body portion extends from the wearer's waist and has the legs connected thereto. The lower edge of the upper body portion and the lower edges of the sleeves are gathered with the insertion of a means for causing said sleeves to be in substantial contact at the wearer's wrist area and means for causing the upper body portion to be in substantial contact at the wearer's hip area, such as for example an elastic band or a draw string in a casing or snaps. The top edge of the lower body portion and lower edge of the legs are gathered with the insertion of, for example, an elastic band in a casing. The combination of elasticized band and generous allowance of material results in a blousing effect which causes the garment to stand away from the body without the use of other devices.

In another embodiment, there would be a small mouth opening with a protective flap secured by VELCRO fastener to give the wearer easy access to his mouth for eating, drinking or other activities which require that the mouth be accessible through the otherwise fully enclosed head net.

In summary, the invention disclosed herein overcomes the several problems discussed previously. Most significantly, the insect protective garment of the instant invention does not provide for complicated features and unnecessary openings. Most importantly it has been found that if the mesh is semi-rigid and the seams are put together in such a manner so as to enhance the rigidity, and the seams are located as taught herein, the lightweight semi-rigid insect excluding mesh is all that is needed to provide the protection for the wearer. Additionally, because of the relative simplicity of the garment, it is lower in cost and more people, including children can afford to have such a garment.

Further advantages of the present invention will become apparent to those skilled in the art of insect protective garments upon examination of the drawings and the detailed description of the invention.

BRIEF DESCRIPTION OF THE DRAWINGS

FIG. 5 is a front view of the upper body portion of the garment embodying the invention further disclosing a zipper as a means for opening and closing the fully encloseable head net and permitting the wearer to place the fully encloseable head net to the rear of the wearer's face which zipper may also be incorporated into the head net embodiment illustrated in FIG. 4; and FIG. 6 is an enlarged view of the fully encloseable head net illustrating the zipper being from the right side shoulder seam across the front of the garment to the left side shoulder seam.

DESCRIPTION OF THE PREFERRED EMBODIMENTS

Figure 1:
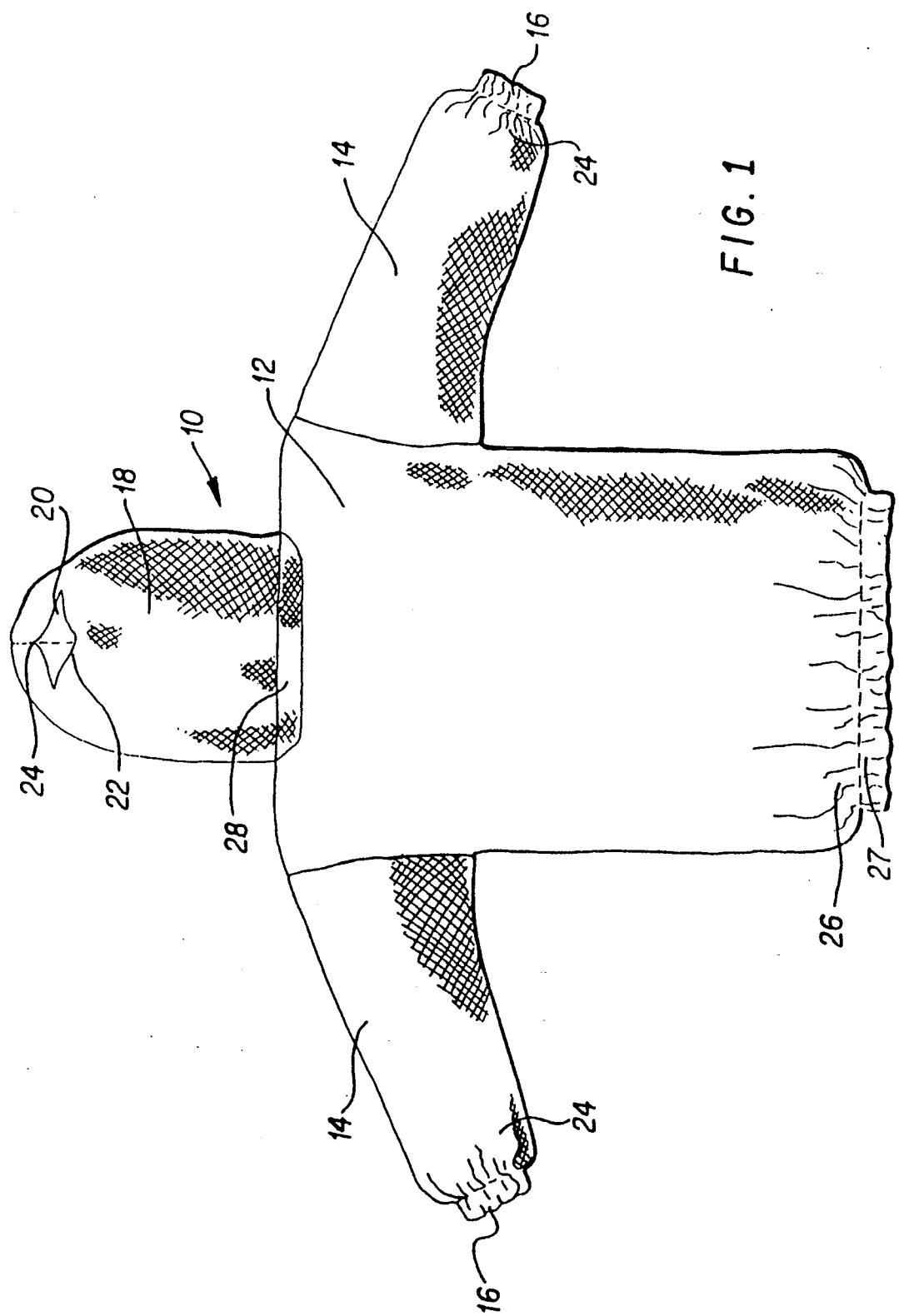
FIG. 1 is a front view of the upper body portion of the garment embodying the invention.

Referring now to the drawings and in particular to FIG. 1 there is illustrated at 10 the present invention in the form of an insect protective upper body garment. The garment 10 comprises an upper body portion 12 of lightweight semi-rigid insect excluding mesh, such as the screening commonly sold for use in campers or tents. The garment 10 is deliberately made loose fitting to enable the user to comfortably wear the garment over regular clothes, and to produce the blousing effect necessary for maximum insect protection properties.

The wearer's arms are protected by sleeves 14 made of the semi-rigid insect excluding mesh. An elastic band 16 is provided at the perimeter of the wrist end of sleeves 14 to exclude insects from between the wrist and the arm of the wearer. The elastic band 16 also produces the blousing effect 24 which maintains distance between the mesh and the wearer's skin.

The upper body garment 10 features a fully enclosed, one-piece head net 18 sewn to the upper body portion 12 at the neck. A multi-layered triangular fold 20 at the front of the head net seam 44 gives stability and shaping, and gives further support in the face area. The wide semi-square neckline 28 holds the head net 18 well away from the wearer's face which gives excellent protection and comfort without the use of other stiffening or spacing devices.

The triangular fold 20 is positioned on the head net 18 so that when it is donned by a user the forward facing edge or side 22 of the triangular fold 20 is slightly forward of and about parallel to the forehead of the wearer. As a typical dimension for the adult large size of garment this forward facing edge or side 22 may be about six (6) inches in length. The vertex 24 opposite the forward facing edge 22 of the triangular fold 20 is located approximately on the head net seam 44 and, for the large sized garment, the perpendicular distance from the forward facing side 22 to the vertex 24 is about 3 inches. The dimensions of the fold 20 will obviously vary with the size of the garment 10. However, the length of the forward facing edge 22 is at least equal to the width of the face of an average wearer of the garment 10 and in the case of the large size garment this length is about 6 inches more or less.

Preferably, all seams are sewn as one-half inch seams. Beside straight stitching, a commercial-type double overlock which creates a casing over the raw edge of the fabric may be used. It is well known that this form of construction provides excellent strength and durability to a manufactured garment. While it is not the intention to teach a method for making the garment 10 including incorporating triangular fold 20 into it, for there are many methods which could be used, it could be noted that the head net 18 may be made in the following manner. A patterned piece of mesh, which pattern is readily devised by one of ordinary skill, is appropriately folded and sewn along one edge. This seam, when garment 10 is complete, is head net seam 44. This seam 44 basically creates the head net 18 configuration or cavity having a neckline. When this head net is attached to the upper body portion 12 at the neckline 28, the head net portion is created without the triangular fold 20 but having a forward positioned point created by junction of the sewn edge and the fold of the mesh material. When this point is folded over (creating a forward facing edge or fold 22), pulled back by an appropriate amount, for example three (3) inches more or less, folded down and positioned onto head net seam 44 and attached thereto, triangle fold 20 is created. The point when folded down onto seam 44 becomes vertex 24. The mesh which makes up triangular fold 20 is now three layers thick. This three layer thick triangular fold 20, which is clearly more rigid than a thickness of any lesser number of layers, acts similarly to a built in cap visor. This construction, at least in part, makes the head net 18 have the novel features and advantages disclosed herein.

It is again noted that the methods for making the triangular fold 20 are not within the scope of this invention and such methods which may be used to make such a multilayered fold are not being claimed as a part of the invention, a method for making the fold 20 is offered even though an ordinarily skilled seamstress or garment maker would have no difficulty in creating such a fold 20 by any number of methods. Nevertheless, to further explain at least one method for making hood 18 and fold 20, FIGS. 3A and 3B and the following more detailed discussion of the making of hood 18 and fold 20 have been included.

Figure 3:
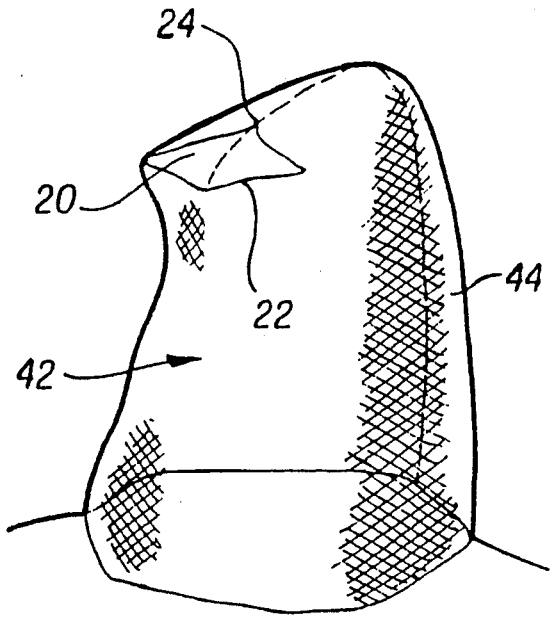
FIG. 3 is an enlarged view of the fully enclosed head net.
Figure 3A:
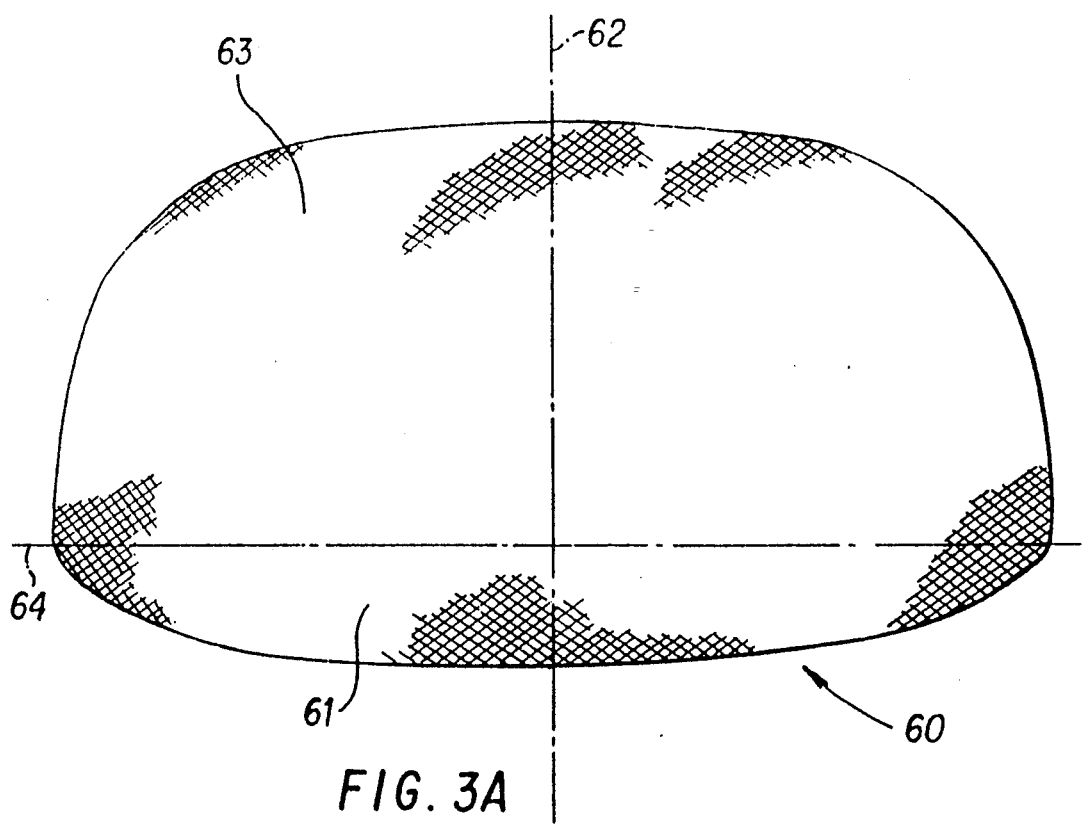
FIG. 3A pictorially illustrates the head net piece of fabric 60 along with the vertical axis of symmetry and the horizontal axis of the approximate ellipse.
Figure 3B:
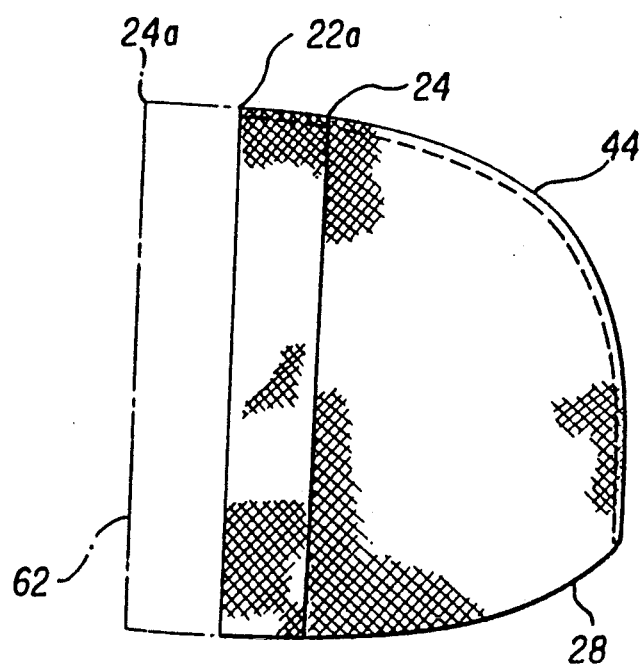
FIG. 3B pictorially illustrates the head net piece of fabric 60 folded along the vertical axis of symmetry (shown in shadow) and the head net after the corner is folded and sewn into the head net seam single hatching illustrates double layer and double hatching illustrates four layers.

Reference is now made to FIG. 3A which pictorially illustrate the hood piece of fabric 60 along with the vertical axis of symmetry and the horizontal axis of the approximate ellipse. The hood 18 is tailored from a piece of fabric 60 which is roughly the shape of an ellipse. The hood piece of fabric 60 has short axis of symmetry 62 but not necessarily symmetry about the long axis 64. The upper portion 63 (when the long axis of this approximate ellipse is horizontal) or the portion above the long/horizontal axis 64 being larger than the portion below 61 the horizontal axis 64. The lower portion edge of the piece of fabric 60 will eventually form the neckline seam 28 which seam creates an enlarged neckline which gives hood 18 a broader base thus helping to keep the hood 18 well away from the face of the wearer. The hood 18, when on the wearer, has somewhat the shape of a pyramid from the viewpoint that the base (neckline) is relatively large. Reference is now made to FIG. 3A and 3B. A first step in the making of the hood 10 and particularly triangular fold 20 may be to fold the hood piece 60 along the short axis of symmetry 62 and to create/sew a portion of seam 44 beginning at the neck line 28. Before sewing seam 44 all the way to the fold, i.e., the short axis of symmetry 62, the corner 24a created at the top of the folded piece (what will ultimately be what is being called vertex 24) is folded under (but it could also be folded over and rearward) so that the corner 24a is about three (3) inches rearward of what is now a new corner 22a which corner 24a is now about three (3) inches rearward of the new created corner 22a. The first created corner 24a and the edge created upon folding it under and rearward are placed in alignment with what will ultimately be the completion of seam 44. The action of folding corner 24a under or over results in a four layer thick section 65 shown cross hatched in FIG. 3B. The seam 44 is now complete noting that the first corner 24a and the new corner 22a become a part of seam 44. When the piece is turned "right-side out" vertex 24, forward facing edge 22 (where corner 22a was located), the three layer multilayer fold 20 and hood 18, unattached to the body portion 12, are created. The hood 18 is attached to 18 at seam 28. Edge 22 is about six (6) inches long and the distance from edge 22 to vertex 24 is about three (3) inches and there are now three (3) layers of material making up fold 20.

It is clear to anyone having ordinary skill as a garment maker that the hood 18 with the multilayered triangular fold 20 could be made by taking the so-called first corner 24a and folding it over the top of the outside of the hood with seam 44 already completed and the hood already attached (or not attached) at the neckline 28. The first corner 24a would be folded back so that it is about three (3) inches from the now created edge 22 and it is attached there by sewing or by any other acceptable means—24a becoming now vertex 24. Again, the result is the creation of triangular fold 20 having three (3) layers of material to provide rigidity to the hood 18.

The upper body portion 12 extends from the shoulders to proximate the hips of the wearer. An elastic band 27 is provided at the perimeter of the lower edge of the upper body portion 12 to exclude insects from between the elastic band and the body of the wearer. The elastic band 27 also produces the blousing effect 26 which maintains distance between the mesh and the wearer's skin.

Figure 2:
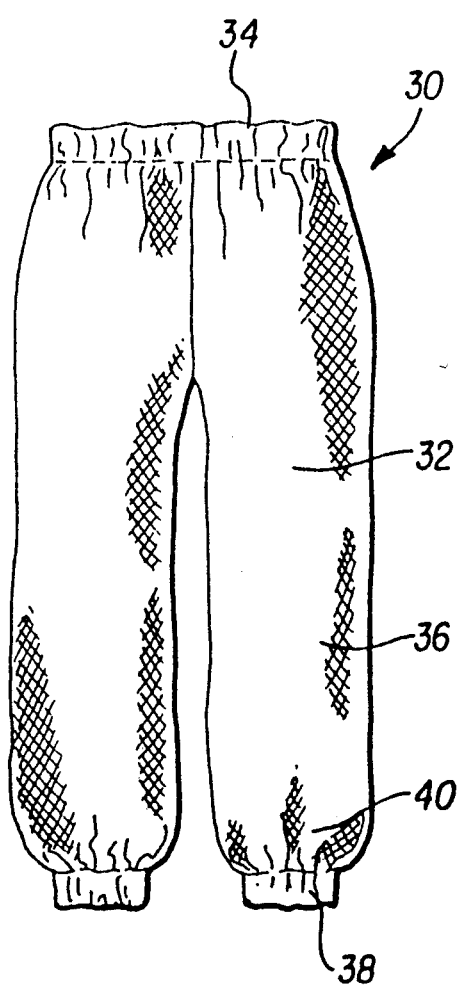
FIG. 2 is a front view of the lower body portion of the garment embodying the invention.

Referring now to FIG. 2, there is illustrated at 30 the present invention in the form of an insect protective lower body garment. The garment 30 comprises a lower body portion 32 of semi-rigid insect excluding mesh preferably light in weight. The garment 30 is deliberately made loose fitting to enable the user to comfortably wear the garment over regular clothes, and to produce the blousing effect necessary for maximum insect protection properties.

The lower body portion 32 extend downward from an elastic waistband 34. A pair of leg members 36 are interconnected to the lower body portion 32. An elastic band 38 is provided at the lower or ankle ends of the leg members 36. The elastic band 38 also produces the blousing effect 40 which maintains distance between the mesh and the wearer's skin.

Referring now to FIG. 3, there is illustrated at 42 an enlarged view of the fully enclosed head net 18 sewn to the upper body portion 12 at the neckline 28. The multilayered triangular fold 20 is clearly visible as is the head net seam 44 which extends the full back length of the head net 18, giving the head net 18 shape and stability.

Figure 4:
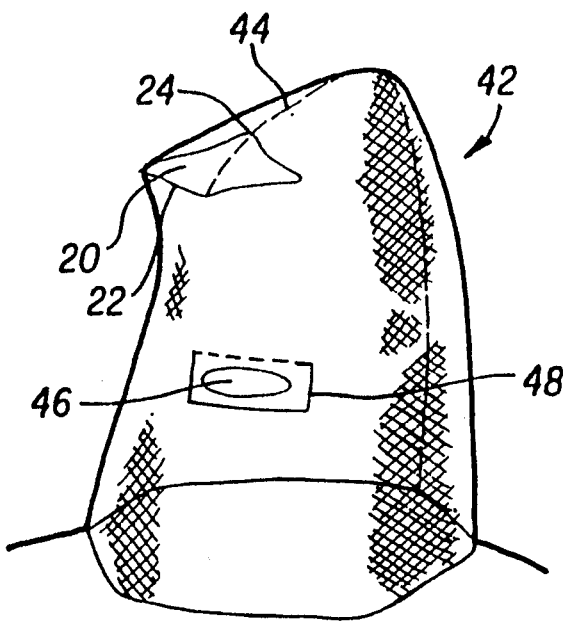
FIG. 4 is an enlarged view of the fully enclosed head net showing an additional embodiment having a flap for access to the wearer's mouth.

Referring now to FIG. 4, there is illustrated at 42 an enlarged view of the fully enclosed head net 18 sewn to the upper body portion 12 at the neckline 28, showing an additional embodiment of a small mouth aperture 46 covered with a protective flap 48 secured by VELCRO fastener to give the wearer easy access to his mouth.

Referring now to FIG. 5 and FIG. 6, there is illustrated at 52 an enlarged view of the fully enclosed head net 18 sewn to the upper body portion 12 at the neckline 28 from a right side shoulder seam 56 across the rear portion 28B of the neckline 28 to the left side shoulder seam 58. A zipper 54 is appropriately attached to provide a closure of the front portion 28A of neckline 28. Zipper 54 being from the right side shoulder seam 56 across the front portion 28A of neckline 28 to the left side shoulder seam 58. Zipper 54 provides a means for opening and closing the fully encloseable head net 52 and permitting the wearer to place head net 52 to the rear of the wearer's face. Zipper 54 may also be incorporated into head net embodiment 42 illustrated in FIG. 4. While zipper 54 is shown to have two (2) pulls clearly a single pull type of zipper may also be used.

It will be readily apparent that the upper body garment 10 and the lower body garment 30 can be used together to cover substantially the entire body and limbs of the wearer, or worn separately in conjunction with other types of wearing apparel. It will also be readily apparent that the upper body garment 10 is donned by simple placing the opening formed by elastic band 27 located at the perimeter of the lower edge of the upper body portion 12 over wearer's head and pulling garment 10 down while inserting wearer's arms into sleeves 14. The lower body garment 30 is donned by simply stepping into the opening formed by elastic waist band 34, pulling garment 30 upward while inserting wearer's legs into leg members 36.

It is thought that insect protective garment of the present invention and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. An insect protective garment variable sized and configured to cover at least a portion of a wearer thereof comprising:

an upper body portion adapted to have openings therein appropriately sized and positioned to permit donning by said wearer over at least a portion of said wearer's upper body;

a pair of sleeves appropriately attached to said upper body portion;

a one-piece fully encloseable head net stitched to said upper body portion from about a right side shoulder seam to about a left side shoulder seam forming a rear portion of a neckline;

a means for opening and closing appropriately attached to a front portion of said neckline;

said upper body portion, said pair of sleeves and said heat net formed of a single layer of see-through semi-rigid insect excluding mesh and wherein said heat net further comprises; a multi-layered triangular fold formed and located at a top forward facing area of said head net and having a forward facing edge and a vertex opposite said forward facing edge; and a head net seam extending from said forward facing edge of said fold over top and downward substantially to the rearward facing bottom of said head net, said vertex being affixed to said head net seam a predetermined and appropriate distance rearward of said forward facing edge.

2. The insect protective garment according to claim 1 wherein said means for opening and closing is a zipper.

3. The insect protective garment according to claim 2 wherein said zipper is attached from said right side shoulder seam across said front portion of said neckline to said left side shoulder seam, said zipper provides a means for opening and closing said fully encloseable head net and permitting the wearer to place said head net to the rear of the wearer's face.

4. The insect protective garment according to claim 1 wherein said heat net further comprises; a small mouth aperture positioned proximate to the mouth of said wearer; and a protective flap sewn to said head net along a distance of less than one-half the perimeter length of said protective flap.

5. The insect protective garment according to claim 4 wherein said means for opening and closing is a zipper.

6. The insect protective garment according to claim 5 wherein said zipper is attached from said right side shoulder seam across said front portion of said neckline to said left side shoulder seam, said zipper provides a means for opening and closing said fully encloseable head net and permitting the wearer to place said head net to the rear of the wearer's face.

* * * * *